United States Patent
Sachdev et al.

(10) Patent No.: US 8,783,214 B2
(45) Date of Patent: Jul. 22, 2014

(54) OIL MAKE-UP AND REPLENISHMENT OIL FILTER AND METHOD OF USE

(75) Inventors: Anil K. Sachdev, Rochester Hills, MI (US); Edward P. Becker, Brighton, MI (US); Thomas A. Perry, Bruce Township, MI (US); Emerson J. Adams, Sterling Heights, MI (US); Thomas C. Pederson, Rochester Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 35 days.

(21) Appl. No.: 12/545,244

(22) Filed: Aug. 21, 2009

(65) Prior Publication Data

US 2011/0041796 A1  Feb. 24, 2011

(51) Int. Cl.
- *F01M 9/02* (2006.01)
- *F01M 11/12* (2006.01)
- *B01D 35/143* (2006.01)
- *B01D 37/02* (2006.01)

(52) U.S. Cl.
CPC .......... *F01M 9/02* (2013.01); *F01M 11/12* (2013.01); *B01D 35/143* (2013.01); *B01D 37/025* (2013.01)
USPC ............ 123/1 A; 123/73 AD; 123/196 A; 123/196 R; 123/304; 73/114.55

(58) Field of Classification Search
CPC ............ F01M 9/02; F01M 2001/1014; F01M 2001/1007; B01D 35/143; B01D 37/025
USPC .......... 123/196 S, 73 D, 198 D, 196 AB, 1 A, 123/73 AD, 196 R–196 A, 114.55, 304; 244/1 R; 184/6.3, 103.1, 103.2, 108, 184/6.22; 91/501; 417/13; 701/101–104
See application file for complete search history.

(56) References Cited

U.S. PATENT DOCUMENTS

| | | |
|---|---|---|
| 4,075,097 A | 2/1978 | Paul |
| 4,075,098 A | 2/1978 | Paul et al. |
| 4,144,166 A | 3/1979 | DeJovine |
| 4,265,748 A | 5/1981 | Villiani et al. |
| 4,406,784 A * | 9/1983 | Cochran .................. 210/167.05 |
| 4,615,305 A * | 10/1986 | Matsumoto .............. 123/73 AD |
| 4,755,289 A | 7/1988 | Villiani |
| 4,847,768 A | 7/1989 | Schwartz et al. |
| 5,552,040 A | 9/1996 | Baehler et al. |
| 5,567,342 A * | 10/1996 | Inoue et al. .................. 508/287 |
| 5,591,330 A | 1/1997 | Lefebvre |
| 5,701,862 A * | 12/1997 | Inoue et al. ................ 123/196 S |
| 6,045,692 A | 4/2000 | Bilski et al. |

(Continued)

FOREIGN PATENT DOCUMENTS

| | | |
|---|---|---|
| CN | 101115911 A | 1/2008 |
| WO | 2005088084 A1 | 9/2005 |

*Primary Examiner* — Lindsay Low
*Assistant Examiner* — Kevin Lathers
(74) *Attorney, Agent, or Firm* — Reising Ethington P.C.

(57) ABSTRACT

An oil filter and oil-additive dispensing device comprising an oil filter and oil additive replenishment system further comprising: a full-flow oil filter; a by-pass oil filter; an oil additive dispensing system; and an on-vehicle controller to dispense additive as required, track additive consumption and signal the need for a replacement system is described. Also a method of using such oil filter and oil-additive dispensing device to extend the useful life of lubricating oil in a vehicle engine is described.

19 Claims, 3 Drawing Sheets

(56) References Cited

U.S. PATENT DOCUMENTS

| | | | |
|---|---|---|---|
| 6,161,510 A * | 12/2000 | Ishikawa et al. | 123/73 AD |
| 6,196,057 B1 * | 3/2001 | Discenzo | 73/54.01 |
| 6,938,585 B2 * | 9/2005 | Schneider | 123/1 A |
| 7,124,729 B2 | 10/2006 | Caracciolo | |
| 8,327,818 B2 * | 12/2012 | Jefferies et al. | 123/196 A |
| 2006/0254986 A1 * | 11/2006 | Hanson et al. | 210/739 |

\* cited by examiner

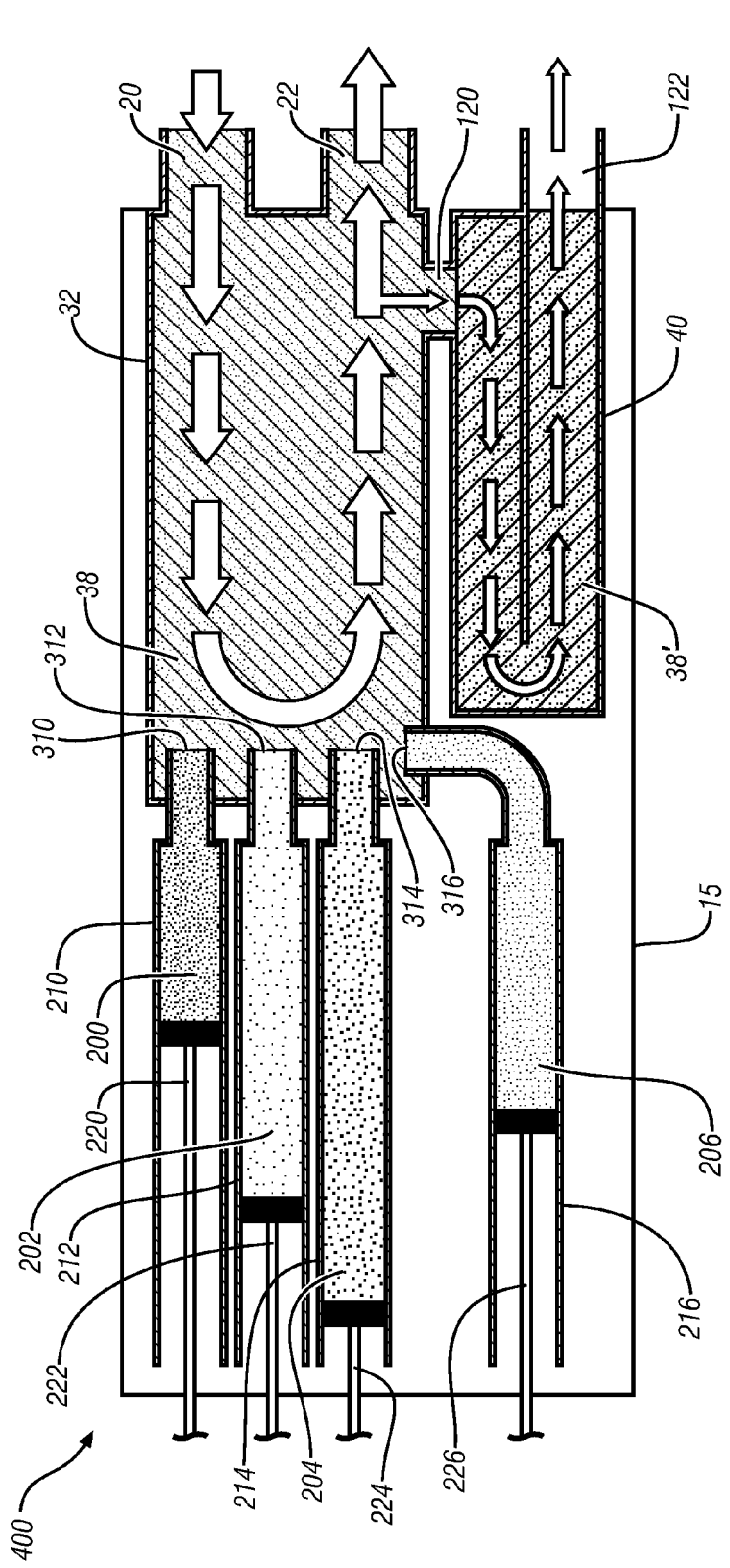
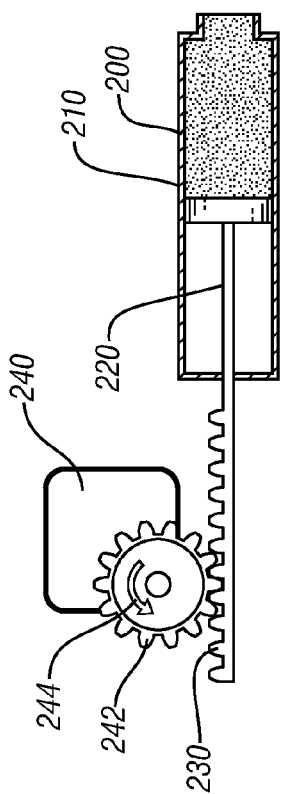
FIG. 2
FIG. 3

OIL MAKE-UP AND REPLENISHMENT OIL FILTER AND METHOD OF USE

TECHNICAL FIELD

This invention relates to a means of minimizing oil changes through addition of make-up oil and replenishment of oil additives in conjunction with oil filter changes.

BACKGROUND OF THE INVENTION

Used oil drained from internal combustion engines may contribute to soil, surface water, and groundwater contamination if not properly managed. Traditionally vehicle motor oil has been changed on a routine basis, usually either at mileage or time intervals. These intervals were generally conservative to avoid any possibility of engine damage, and led to the need to responsibly dispose of billions of gallons of used oil per year.

A more recent development has been the development of algorithms or sensors to estimate or directly measure the state of the oil and signal its need for replacement only when its lubricating capability fell below acceptable levels. This has generally led to longer oil change intervals than the previous routine approach and has reduced, but not minimized or eliminated, the volume of used oil requiring disposal.

Oils are generally complex mixtures of chemical compounds characterized by a base stock and a combination of additives, collectively described as an additive package, selected to improve specific performance attributes. Traditionally the base stock was a petroleum hydrocarbon derived from crude oil. Increasingly, however, synthetic base stocks such as polyalphaolefin (PAO) or synthetic esters and related synthetics such as alkylated napthalenes and alkylated benzenes are used. In general, both the base stock and the additive package are selected to convey desired oil attributes at a level commensurate with the oil's intended application.

The need to change oil is driven by the need to remove contaminants and to replenish the additive package which is progressively consumed or 'used up' with use. Most of the base stock itself does not "break down", although minor quantities which lubricate the cylinder walls and migrate past the piston rings may be combusted in the combustion chamber. Hence "used" oil may be viewed as primarily unused oil with contaminants coupled with an absence of, or a reduced quantity of, additives.

Thus the volume of used oil requiring disposal could be further reduced if the particle contamination could be managed and if the additive package could be replenished. With these adjustments, and possibly some minor addition of unused oil, used oil could be regenerated to offer the lubricating and engine protection capability substantially identical to that of unused oil.

SUMMARY OF THE INVENTION

An oil filter and oil-additive dispensing device for extending the life of the lubricating oil for an internal combustion engine in a vehicle is described. The oil filter and oil-additive dispensing device are inserted into the vehicle engine oil circulation system which provides a continuing flow of lubricant to engine parts.

Lubricants comprise base oil and at least one additive for lubrication performance. Lubricants decline in effectiveness during use as the additives are progressively exhausted during engine operation and the base oil becomes contaminated with particulates which are generally by-products of combustion. This decline may be measured or predicted by using appropriate sensors in conjunction with a computer located on the vehicle.

The life of the circulating lubricating oil is extended by an oil filter and oil-additive dispensing device of this invention which comprises two filters capable of more aggressively removing particulates than conventional oil filters, a supply of oil additives and a means of dispensing or introducing the additives into the base oil.

Thus the filters continually maintain a low level of particulate contamination and when the additive level(s) decline to an unacceptably low level additional additive(s) will be dispensed, in one embodiment by an automated system triggered by a signal from the computer.

The means of attaching the oil filter and oil-additive dispensing device to an engine will also be new. This new means of attachment offers opportunity to customize specific oil filter and oil-additive devices to specific engines or engine families and further offers opportunity to better match the proportion or quantity of additive(s) to the expected use patterns of the vehicle.

BRIEF DESCRIPTION OF THE DRAWINGS

FIG. 2 shows an oil filter package representative of the current invention which incorporates a full-flow filter, a by-pass filter, a complement of make-up additives and a means for controllably dispensing the additives.

FIG. 3 shows the method of controllably dispensing additives initially shown in FIG. 2 in greater detail.

DESCRIPTION OF PREFERRED EMBODIMENTS

Figure 1:
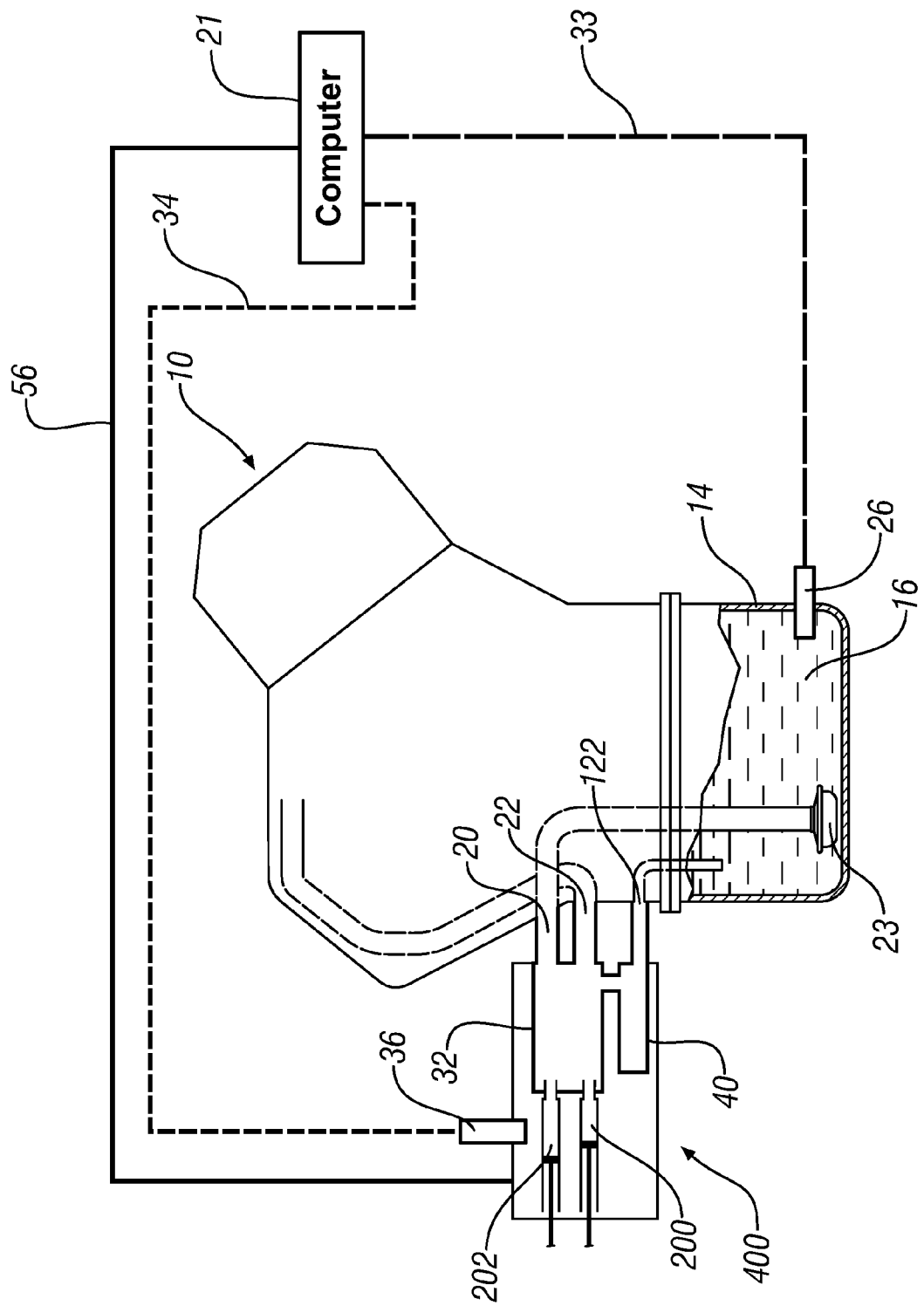
FIG. 1 shows application of the invention to a vehicle engine and provides an illustrative overview of the interaction of the filter package with the engine oil distribution system, sensors and an on-vehicle computer.

Many of the constituents of vehicle engine oil remain substantially unaffected during use; other constituents are consumed and used up in use; and still others, though largely unaffected themselves, become contaminated with combustion products.

Conventional approaches to ensuring an on-going flow of suitable lubricating oil in the engine over the vehicle life are based on simply draining and discarding the used oil after a suitable use period and replacing it with fresh. Historically the use period was based on time or on distance traveled, but better understanding of the degradation mechanisms of vehicle oil has led to the development of algorithmic or measurement-based techniques to more accurately identify the remaining lubricating capability of the oil. Even with these more sophisticated approaches to identify the end of useful life of engine oil, generally enabling less frequent oil changes, the basic approach of discard and replace still is the dominant approach to ensuring proper lubrication for vehicle engines.

The approach adopted herein is based on the recognition that a large volume of the oil has undergone minimal chemical change and thus may be re-used. This requires replenishing those constituents which are consumed and removing the contaminants from the remainder. With these approaches it is feasible to significantly extend the period of use before the oil needs to be completely replaced with new oil._

In common with current practice, this invention anticipates that oil, once charged to the vehicle will deliver the desired lubricating properties for only a finite time before action must be taken. Thus the practice of the invention is initiated by knowledge that the oil currently charged to the vehicle is approaching the end of its utility in providing adequate lubrication for the engine.

Time-based or mileage-based end of oil life predictions are quickly being supplanted by algorithmic approaches. Algorithmic approaches which use knowledge of engine operating parameters, for example oil temperature, to estimate oil life have been made feasible by both the greater number of engine sensors by the growth in on-vehicle computing power. Further advances are based on direct assessments of oil quality through sensors oil electrical properties such as resistivity and permittivity. With appropriate on-vehicle instrumentation in conjunction with an on-vehicle computing and control device the end of useful oil life may be determined on the vehicle and communicated to the driver. The communication may be through an in-vehicle message display optionally supplemented by an audible alarm, or may be communicated using a vehicle communication system such as Onstar® or through e-mail or a cell-phone.

As with current practice, an end of oil life notification will signal that the oil filter should be changed. In contrast to current practice however the oil filter, more properly the oil filter package, will incorporate dispensable oil additives capable of regenerating the lubricating and engine protection functions of the oil. This is accomplished through an oil filter package which differs in configuration from that used in current practice.

Current practice is generally to employ a single, 'full-flow', filter which is often in the shape of a round, cylindrical can of suitable size and filter capacity. The can is inserted into the lubricant circulation system so that all the engine oil passes through the filter which retains larger particulates, generally those of about 20 micrometers and greater. This filter, frequently described as a 'spin-on' filter, attaches at one end, to the engine by means of a large internally-threaded hollow boss. Oil is pumped into the filter through a series of openings arrayed around the hollow boss and after passing through the filter medium exits through the hollow boss.

Various efforts have been made to modify this general design to enable additive additions to the engine oil following an oil change. These approaches and any other approaches that would adapt the current spin-on oil filter to enable progressive release of additives are not suitable for the present invention because they anticipate that the oil will be changed and thus make no provision for the retention of the bulk of the used oil within the engine. In fact, the current practice for draining oil from an engine is to remove the filter and let at least some of the used oil drain though the engine openings which are complementary to the filter inlet openings.

It is an objective of this invention to reduce the volume of used oil discarded through re-use of as much of the used oil volume as possible. Thus the practice of this invention requires a filter which connects to the engine oil circulation system though a connection which, when opened, will not leak oil but instead retains it within the engine. It is possible to prohibit leakage from both the filter and the engine. Such 'dry break' connections are well known in the art and are commercially available from manufacturers such as Snaptite, Aeroquip, Parker and Hansen. This offers convenience but would retain some oil in the filter requiring the addition of some makeup oil to maintain the engine oil level upon filter replacement. This may be addressed in several ways, including draining the oil filter prior to changing it and re-introducing the oil to the engine; adding a charge of unused oil to the engine in conjunction with a filter change; but it is most conveniently accomplished by supplying the replacement filter pre-charged with a suitable volume of replacement oil.

An alternative approach would be to mount the filter in an inverted position above the sump, but beyond the oil pump, where gravity would insure the filter is empty when the engine is not running. However such an approach would lead to 'dry starts' briefly depriving the engine of additional oil on start-up until the filter is filled with oil and is therefore not a recommended practice The use of sealing connectors will enable and require a change in filter design. Thus it will be feasible to incorporate in the filter an additive package and dispensing system without the restrictions imposed by the current design.

Further, in view of the aim of reducing engine oil change intervals the efficiency of the engine oil filter should be improved to enable it to remove smaller particles than are currently removed with current full-flow filters. As practiced in the prior art, this is accomplished by paralleling a by-pass filter, capable of retaining particulates of about 2 micrometers and larger with the full flow filter. Typically a by-pass filter is located in a secondary oil circulation system which joins with the primary oil circulation system after the oil has passed through the full-flow filter. Approximately 10% of the oil flowing in primary oil circulation system is diverted through the by-pass filter and the filtered oil is discharged to the oil pan.

In the preferred embodiment of this invention, a full flow oil filter, a by-pass filter and oil replenishment capability will be combined into one filter package contained in a housing, incorporating three connections to the oil circulation system. The general implementation of the invention in a vehicle engine is illustrated in FIG. 1 which shows a schematic representation of an engine 10 with oil pan 14 containing oil 16 and distributed by oil pump 23. The circulating oil after exiting oil pump 23 enters filter package 400 (shown in greater detail in FIG. 2) through inlet 20 and enters full-flow filter 32. A portion of the flow from full-flow filter 32 is diverted through by pass filter 40 and exits at outlet 122 before being returned to oil pan 14 while the remainder of the oil exits at outlet 22 and is delivered to all parts of the engine requiring lubrication such as bearings, cylinders etc. (not shown). Thereafter the oil drains from the engine to oil pan 14 to complete the circulation. Also shown in FIG. 1 are oil additive storage units 200 and 202. Oil temperature sensor 26 is located at the oil pan and sends signals to computer 21 through link 33 while additive dispensing sensor 36 is located on filter package 400 and is likewise in communication with computer 21 through link 34. Computer 21 communicates commands to dispense additive from filter package 400 through link 56.

FIG. 2 shows an illustrative embodiment filter package 400 of the invention which comprises a full-flow oil filter 32, a by-pass filter 40 and means for storing and dispensing oil additives, all of these elements being generally packaged or contained in housing 15. It is intended that all the features and capabilities of the current full-flow oil filter will be present in full-flow filter 32. These include an anti-drain back valve to ensure that oil in the filter will not, under the influence of gravity drain back to the engine oil pan when the engine is stopped, and a relief valve to provide a means of continuing to provide oil to the engine even if the filtration medium is clogged.

The oil enters through inlet connector 20, and passes through filter medium 38 of full-flow filter 32 before exiting in major part through outlet connector 22 with the general motion of the oil schematically represented by a series of large arrows. A predetermined portion of the outlet flow from oil filter 32, selected to ensure sufficient flow to the engine, is diverted by baffles or valving or other means (not shown) known to those skilled in the art and directed through inlet 120 to by-pass filter 40. In by-pass filter 40 the oil is passed through filter medium 38' as indicated by the series of small arrows before exiting the filter through outlet 122.

Further review of FIG. 2 however discloses that casing 15 incorporates containers 210, 212, 214, and 216, hollow bodies enclosed on one end with orifices 310, 312, 314 and 316, of reduced dimension on the other end. The containers store additives 200, 202, 204 and 206 which may be released into full-flow filter 32 under the urging of plungers 220, 222, 224 and 226 respectively. The representation of four dispensing systems is intended to be merely exemplary and not limiting.

Typical oil additives include: friction modifiers; detergents; dispersants; ashless antioxidants; and foaming or aeration inhibitors. Thus the number of dispensing systems will generally depend on whether additive formulations to fulfill these needs are provided, and if provided on whether they are dispensed individually or in combination.

A variety of dispensing mechanisms may be used. The arrangement shown in FIG. 2 which resembles a syringe, provides means of dispensing the additive in a controlled manner. Addition of a one-way valve (not shown) or similar flow control device on the dispensing end of the container would prevent backflow or uncontrolled incorporation of the additive into the oil. Similarly piezo-electric or thermally activated and devices such as are used in ink-jet printers for dispensing of ink (not shown) could also be adapted as an additive 'cartridge' to enable controlled dispensing of additive. This could be accomplished by dramatically reducing the dimensions of orifices 310, 312, 314 and 316, and placing a piezo-electric driver or heating element in the channel to propel and eject additive droplets.

This approach however would need to be engineered to operate at the oil pressures typically encountered in a vehicle which range from 7 to 12 pounds per square inch (psi) at idle and up to 80 psi under load or a control algorithm which dispensed additive only when the engine was not running could be employed.

Finally, if batch release were acceptable, break-apart packaging (not shown) might be used which would contain the additive during manufacture and shipping but enable rapid and complete release of the additive on installation in an engine.

The preferred dispensing hardware will depend on the dispensing strategy. Current practice is to introduce additives as a batch with the new oil and a similar approach could be followed in practice of this invention. This might be done for example by: filling the filter package with makeup oil loaded with a full complement of additives; or by separately packaging the additives within the filter package but releasing them immediately upon installation by fracturing or puncturing the package; or as in the syringe-like configuration of FIG. 2 fully depressing all plungers 220, 222, 224 and 226 immediately upon installation.

However with the diversity of additives in common use which include: (a) friction modifiers that are either a metal complex like molybdenum dithiocarbamate or an organic acid or derivative such as glycerol mono-oleate or oleic acid; (b) detergents that are typically calcium carbonate suspended in oil with a sulfonate or phenate; (c) dispersants that are long chain polymer backbone (usually polyisobutylene) connected to a polar group (usually amino); (d) ashless antioxidants that are typically hindered phenols and alkyl diphenylamines; and (e) foam/aeration inhibitors that are typically siloxane polymers, there are advantages to progressive additive release on an 'as-needed' basis to maintain a suitable but not excessive quantity of additive in the oil at all times.

Most additives have potential to cause engine harm if present to excess. By virtue of making batch additive additions, current practice incorporates additives at greater than their needed concentration in new oil in order to ensure that a quantity of additive sufficient to satisfy engine requirements will remain at end of life. Thus current practice represents a trade-off between incorporating large concentrations of additive to extend oil change intervals and minimizing additive content to limit its potential for harm.

Progressively dispensing these additives would ensure that they would never be present in potentially harmful concentrations while simultaneously enabling packaging a larger volume of additives in the filter package to further extend filter package change intervals. Hence it may be preferred to controllably release additives at a rate generally equal to the rate at which they are consumed to maintain a generally fixed level or concentration of additive in the oil at all times. Thus it may be desirable to employ mechanical or thermo-mechanical approaches capable of metered release of additives.

Ink-jet technology based on piezo-electric or thermally-activated devices are inherently capable of dispensing fluids in controlled quantity since the droplet size may be controlled and the number of droplets dispensed readily determined. However, the scheme shown in FIG. 2 may be readily modified to also control the quantity of additive dispensed. As shown in FIG. 3, motion of the plunger may be controlled by an electric motor 240 which rotates toothed gear 242 in a direction indicated by arrow 244. In turn, gear 242 engages rack 230 which is permanently attached to plunger 220 which displaces the additive 200 from its container 210 and into the oil.

In view of the potential for damage if the additive is not dispensed or if it is not dispensed in appropriate quantities, any dispensing system should not be run under open-loop control. Hence it is desirable to have an independent measure confirming both that additive was dispensed and that a suitable quantity was dispensed as indicated at sensor 36 and communication link 34 in FIG. 1.

For example, for the syringe-like system just described, it is feasible to infer the quantity of additive dispensed by tracking, with appropriate instrumentation or encoders, motor current or the rotation of gear 242 (FIG. 3) to infer displacement of plunger 210. More desirably the displacement of plunger 210 may be measured directly by incorporating a using a linear encoder or other measurement device like a linear variable differential transformer. Even more desirably, a flow meter (not shown) could be installed at the outlet of container 200.

All of these approaches could give rise to erroneous data. For example slippage of gear 242 or leakage of additive around plunger 220 or instrumentation errors in a flow meter might erroneously signal that additive was dispensed when it had not been.

However, those skilled in the art will recognize that comparison of indirect measures may also be used to more fully characterize correct operation or to identify instrumentation failures or problems. For example if independent measurements of gear 242 rotation and of rack 230 displacement are consistent with the known gear ratio between them this engenders more confidence than either measurement alone. Similar considerations hold for agreement between measurements of flow and rack displacement. Thus it is contemplated that in the practice of this invention appropriate safeguards are introduced to reduce the probability of unknowing oversupply or undersupply of additive to acceptably low levels. It is further anticipated that the quantity of additive dispensed would be sufficient to develop a sensor signal which could readily be distinguished against background noise.

In the case of a piezo-electrically or thermally-actuated inkjet-like dispensing 'cartridge', the rapid expulsion of each droplet will lead to an acoustic or pressure pulse which may be detected by a microphone or pressure sensor. In this case, the signal should be readily distinguished from background noise on the basis of a relatively simple phase relationship between the sensor signal and the dispenser actuation command signal. Coupled with knowledge of the droplet size which will be a function of the geometry of the additive 'cartridge', the volume of additive dispensed may be tracked.

As additive is continually dispensed and measured, by whatever mechanism, the total volume dispensed may be computed and the results stored. Coupled with knowledge of the initial volume of additive charged to the filter package the remaining volume of additive may be determined and used to estimate remaining oil life. Alternatively, it may be possible to determine the remaining additive volume directly. For example, for the syringe-like device depicted in FIG. 3 the remaining volume might be determined directly by tracking plunger position.

Thus electronic and electrical connections to the filter package are required to provide power to initiate additive dispensing and to power sensors which may provide information to an on-vehicle computing and control device regarding the remaining additive content of the filter package. These features and connections are well known to those skilled in the art and are not shown.

An additional feature of the current invention is that it may incorporate a means of confirming that a new, rather than a used, filter package has been installed and a means of transitioning the device from one state to the other. Simple mechanical approaches such as a seal which will be ruptured during cartridge installation may be employed. Alternatively electrical approaches may be used. Electrical approaches have the advantage that they will generate an output which may be interpreted by the on-vehicle computing and control device to trigger a persistent error message to the operator. A simple approach is to incorporate a resistor of known value in parallel with the power circuit for the dispensing device such that application of power to the dispensing device will 'blow' the resistor and create an open circuit. Thus a sense circuit would simply need to measure the resistor value on filter package installation to determine that a new package had been installed while any use of the filter would immediately 'blow' the resistor to indicate a used, or more properly, an other-than-new filter package. The transition from an unused state to a used state would signal that that a new filter package had been installed and trigger the on-vehicle computing and control device to reset all additive volumes to a value corresponding to those in an unused filter package.

Finally it is necessary to ensure that the correct filter package has been selected and that it has been installed correctly. Physical installation may be monitored through measurements of the oil pressure since a failure of any of the couplings between the filter package and the engine would quickly manifest itself as a pressure drop. Electrical installation would be simply addressed by having the on-vehicle computing and control device direct a series of commands to the filter package and monitor the results to ensure that they were within expected value ranges.

Figure 4A:
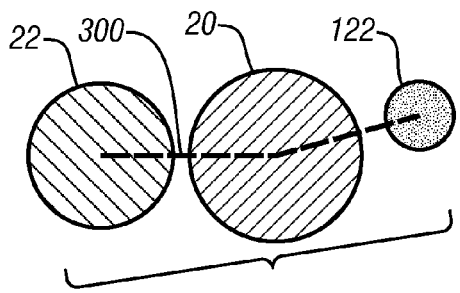
FIGS. 4A, B, C, D, E, and F show six distinguishable connector configurations suitable for attachment of the oil filter package to an internal combustion engine.
Figure 4B:
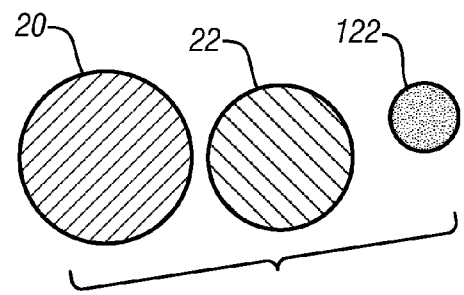
Figure 4C:
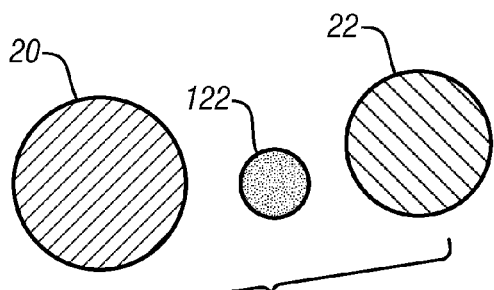
Figure 4D:
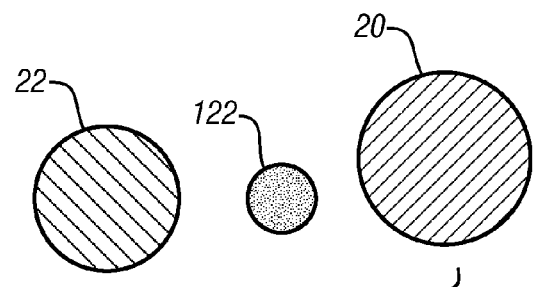
Figure 4E:
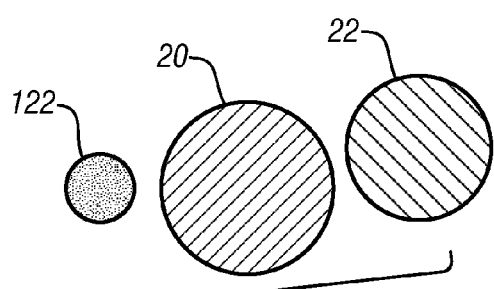
Figure 4F:
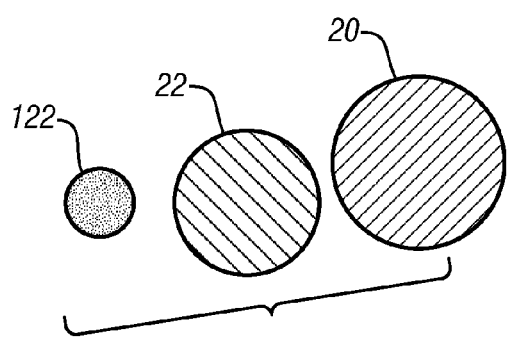

Selection of the correct filter package may be accomplished by appropriately sizing and position coding the three oil flow connections: inlet 20; full-flow filter outlet 22; and by-pass filter outlet 122. Since 100% of the oil flow passes through inlet 20 but the outlet is split between outlets 22 and 122 in ratio of 90:10, the area ratio of the three physical connections may be scaled in like manner to render them distinguishable. The connector centerlines may then be arranged in an asymmetric geometric arrangement such as shown at 300 in FIGS. 4A so that six distinct placements of the three connectors are possible, for example as shown in FIGS. 4A, B, C, D, E and F. Thus by varying the overall geometric pattern and by varying the connector placement within each arrangement it is feasible to uniquely associate a specific filter package and hence a unique additive package formulation with specific engines or engine families thereby rendering impossible attaching the wrong filter package to the wrong engine.

Of course, electronic approaches may also be used to assure that the correct filter package is used for a specific engine. This may be done instead of, or in conjunction with, the above mechanical approach, and may be implemented, for example, by integrating suitably coded chips or other measures in the filter package and means to read the chips in the on-vehicle computing and control device. With this approach the on-vehicle computing and control device could be programmed to respond to a mis-match between the installed filter package and the 'correct' filter package in an appropriate manner. Since such a mis-match could have potential for vehicle engine damage it is preferred that extensive use be prohibited. This may be done by disabling the vehicle, for example by disabling the starter, or by permitting the vehicle to be operated under restricted capabilities, for example a 'limp-home' mode, for some restricted time or distance.

It should be noted that not all additives need be present in the filter package and that even if all are present they need not be present in comparable quantity. For example, some additives like viscosity modifiers and anti-foaming agents are minimally consumed, and their quantities would be limited in the replenishment filter pack.

Previous discussions focused on the operation of the additive dispensing devices and means of assuring that they were functioning as required. A broader question is the basis or logic employed by the controller to issue a command to dispense additive. and how much additive to dispense.

One approach is to adopt a closed-loop approach and couple the dispensing of additives to a direct measure of additive concentration in the oil and dispense additives only when independent measures of additive concentration in the oil indicate that additional additive is required. Alternatively and drawing on prior experience with algorithmic approaches, the need for additive additions might be inferred from knowledge of driving conditions and used as a basis for dispensing additives. This, while clearly not as satisfactory as direct additive concentration measures, is based on robust and proven algorithms. Finally the system could dispense additives on a largely open-loop basis and dispense additives based on mileage or time.

Under algorithmic control, or when using time or distance-based approaches, no direct measure of additive content of the circulating oil would be made and dispensing of additives would be based on assumed consumption rates. The success of current oil-life algorithms suggests that such an approach might be successful in anticipating the need to dispense supplemental additives and time-based or distance-based approaches might also be acceptable if suitable safety factors are incorporated in the procedure. The primary issue with these approaches is that they are unable to detect any failure to dispense caused by equipment malfunction, premature exhaustion of the stored additive or other unexpected situation. However many of these concerns may be mitigated by instrumenting the dispensing system as described previously.

Closed-loop control by contrast is more robust since additive dispensing will be predicated on a direct measurement of additive content in the oil and appropriate addition may be verified through direct measurement. On-vehicle chemical analysis of additives is not feasible but on-vehicle measurement of the electrical properties of oil, particularly resistivity and permittivity, has been demonstrated and these data, suitably processed, have been shown to correlate with oil additive depletion.

Thus the practice of this invention may be coupled with on-vehicle oil condition sensing and suitable computational means capable of determining oil additive content and the practice of the invention, in a fully instrumented and controlled system, would proceed as:

a) the oil condition is repeatedly inferred from on-vehicle sensors and compared, using an on-vehicle computing device, with a threshold characteristic indicative of the need to supplement the concentration of oil additives;

b) when the content of at least one of the oil additives falls below its threshold value the on-vehicle computing device will issue a command to the oil filter pack dispensing system instructing it to dispense the least one oil additive c) the required oil additive(s) is (are) dispensed in pre-determined quantity by the oil filter pack and the condition of the oil filter pack is monitored to ensure its continued ability to dispense additives in the desired, pre-determined quantity;

d) steps a), b) and c) are repeated until the oil filter pack is depleted and no longer capable of dispensing additives in the desired pre-determined quantity, then;

e) the vehicle operator is notified of the need to replace the oil filter pack by some communication means such as vehicle dashboard display and/or audible warning, e-mail notification, telephonic notification etc.

f) the vehicle owner or a mechanic removes the used oil filter pack without loss of oil beyond the oil in the oil filter pack;

g) the used filter is replaced with a new filter pack with associated oil additive package and dispensing system, containing new make-up oil of a volume sufficient to replace the oil volume retained in the filter specific to the engine and/or vehicle with unique attachment features to ensure that it fits only on the engine and/or vehicle for which it was intended;

h) installation of the replacement oil filter pack is automatically communicated to the on-vehicle control system which will retain stored information on lubricating oil condition and reset the record of available additive additions to reflect addition of the new oil filter pack; and, i) steps a) through i) are repeated.

If on-vehicle oil condition sensing and suitable computational means capable of determining oil additive content are not available, but sufficient information is available to implement an oil-life algorithm, then the practice of this invention would proceed as follows:

a) the oil condition is repeatedly estimated using an algorithm, which may require inputs representing engine operating conditions, and compared to a predetermined threshold condition signaling the need to supplement the concentration of oil additives;

b) when the estimated content of at least one of the oil additives falls below its threshold value the on-vehicle computing device will issue a command to the oil filter pack dispensing system instructing it to dispense the least one oil additive c) the oil additive(s) is (are) dispensed in pre-determined quantity by the oil filter pack and the condition of the oil filter pack is monitored to ensure its continued ability to dispense additives in the desired, pre-determined quantity;

d) steps a), b) and c) are repeated until the oil filter pack is depleted and no longer capable of dispensing additives in the desired pre-determined quantity, then;

e) the vehicle operator is notified of the need to replace the oil filter pack by some communication means such as vehicle dashboard display and/or audible warning, e-mail notification, telephonic notification etc.

f) the vehicle owner or a mechanic removes the used oil filter pack without loss of oil beyond the oil in the oil filter pack;

g) the used filter is replaced with a new filter pack with associated oil additive package and dispensing system, containing new make-up oil of a volume sufficient to replace the oil volume retained in the filter specific to the engine and/or vehicle with unique attachment features to ensure that it fits only on the engine and/or vehicle for which it was intended;

h) installation of the replacement oil filter pack is automatically communicated to the on-vehicle control system which will retain stored information on lubricating oil condition and reset the record of available additive additions to reflect addition of the new oil filter pack; and, i) steps a) through i) are repeated.

In a final embodiment used only when neither on-vehicle oil quality assessment or algorithmic estimation of oil quality is available, a time or mileage-based system may be used as follows:

a) the vehicle mileage or hours of engine use are repeatedly measured and compared to a predetermined mileages or engine hours signaling the need to supplement the concentration of oil additives;

b) when the mileage or engine hours attain the predetermined value the on-vehicle computing device will issue a command to the oil filter pack dispensing system instructing it to dispense the least one oil additive c) the required oil additive(s) is (are) dispensed in pre-determined quantity by the oil filter pack and the condition of the oil filter pack is monitored to ensure its continued ability to dispense additives in the desired, pre-determined quantity;

d) steps a), b) and c) are repeated until the oil filter pack is depleted and no longer capable of dispensing additives in the desired pre-determined quantity, then;

e) the vehicle operator is notified of the need to replace the oil filter pack by some communication means such as vehicle dashboard display and/or audible warning, e-mail notification, telephonic notification etc.

f) the vehicle owner or a mechanic removes the used oil filter pack without loss of oil beyond the oil in the oil filter pack;

g) the used filter is replaced with a new filter pack with associated oil additive package and dispensing system, containing new make-up oil of a volume sufficient to replace the oil volume retained in the filter specific to the engine and/or vehicle with unique attachment features to ensure that it fits only on the engine and/or vehicle for which it was intended;

h) installation of the replacement oil filter pack is automatically communicated to the on-vehicle control system which will reset the record of available additive additions to reflect addition of the new oil filter pack; and, i) steps a) through i) are repeated.

Depending on the quantity of oil consumed in the combustion process, it may be necessary to add make-up oil to the vehicle. In context of the sequence of steps detailed for each of the three embodiments this might be conveniently done at step g). However since addition of make-up oil is routine maintenance which could be performed at any time, this activity has not been included as an integral part of step g).

The above description is intended to be exemplary and not limiting as many modifications of the above constructions may be made without departing from the scope of the invention. Accordingly the invention is limited only by the following claims.

The invention claimed is:

1. An on-vehicle oil filter and oil-additive dispensing device for an internal combustion engine in a vehicle, the vehicle engine comprising a circulation system for providing a continuing flow of lubricant fluid to engine parts, the lubricant comprising a base oil and at least one additive for lubrication performance, the additive being progressively exhausted during engine operation; the engine additionally comprising at least one sensor capable of making measurements representative of oil condition and additive usage; the vehicle comprising a computer in operative communication with the sensor and capable of processing sensor measurements to assess the current concentration of base oil additives; the oil filter and oil-additive dispensing device being contained within a common housing, attachable to the engine, for receiving full flow of circulating lubricant during engine operation and comprising:
- the common housing having an interface for attachment to the engine, the interface comprising a lubricant input and at least two lubricant outlets;
- an oil filtration system within the housing that receives circulating oil from the lubricant input and discharges oil from the lubricant outputs;
- a storage facility within the housing in communication with the lubricant flow in the device for at least one lubricating oil additive; and
- a dispensing mechanism within the housing for repeatedly transferring an amount of additive from the storage facility into the lubricant flow within the housing responsive to the sensed additive content of the circulating oil being depleted to below a predetermined threshold content.

2. The oil filter and oil-additive device of claim 1 wherein the computer is operatively connected to the additive dispensing device for initiating dispensing of at least one additive into lubricant flowing through the device.

3. The oil filter and oil-additive device of claim 1 wherein the computer is further capable of communicating the amount of the oil additive in the device to a vehicle operator.

4. The oil filter and oil-additive device of claim 1 wherein the circulating lubricant fluid comprises dispersed particles and the filtration system comprises first and second filters, the first filter adapted to receive the full fluid flow in the device, to retain larger particulates, to divert a portion of the fluid flow to the second filter, and discharge the remainder of the fluid flow from a first lubricant outlet, the second by-pass filter being operably connected to the first filter to further filter a portion of the oil diverted from the first filter, the second filter retaining finer particulates and discharging oil from a second lubricant outlet.

5. The oil filter and oil-additive device of claim 1 wherein the attachment interface comprises a plurality of first connector portions capable of removable attachment to a plurality of second connector portions on the engine wherein the attached connector portions form a connector for leak-free passage of flowing lubricant fluid across the interface.

6. The oil filter and oil-additive device of claim 1 wherein the attachment interface is rendered compatible with a specific internal combustion engine by arranging and sizing the removably attachable connector portions on the device in a manner complementary to the arrangement and size of removably attachable connector portions mounted on the specific internal combustion engine.

7. The oil filter and oil-additive device of claim 1 wherein the lubricating oil additive is one of the group consisting of friction modifiers, detergents, dispersants, antioxidants and foam/aeration inhibitors.

8. The device of claim 1 wherein the additive dispensing portion comprises at least one sensor for confirming delivery of a specified quantity of additive.

9. The device of claim 8 wherein the sensor incorporated in the additive dispensing portion for confirming delivery of a specified quantity of additive is one of the group consisting of rotary position sensor, linear position sensor and pressure sensor.

10. The device of claim 8 wherein the additive dispensing portion sensor is operatively connected to a computer.

11. A method for extending the life of lubricant in an internal combustion engine in a vehicle; the lubricant comprising a base oil and at least one additive, the additive being progressively exhausted during engine operation; the engine comprising at least one sensor capable of a making measurements representative of oil condition and additive usage;
- the vehicle comprising a computer in operative communication with the sensor and capable of processing sensor measurements to assess the current concentration of base oil additives to assess a lubricating capability of the lubricant; the engine further comprising an oil filtration system, an oil-additive storage device and an oil-additive dispensing device all contained within a housing which is removably attached to the engine and located in the oil circulation path of the engine for filtering the oil and transferring an amount of additive from the storage facility into the lubricant flowing through the filtration system; the method comprising:
- a) repeatedly assessing the lubricating capability of the lubricant;
- b) comparing the assessed lubricating capability of the lubricant with a pre-determined threshold lubricating capability representative of the end of useful life of the lubricating oil and when the assessed lubricating capability is less than the threshold lubricating capability;
- c) dispensing pre-determined quantities of base oil additives from the oil filter and engine oil additive dispensing device to restore lubricating capability to the lubricating oil in response to the assessed lubricating capability of the lubricating oil being depleted below the predetermined threshold;
- d) repeating steps a) through c) while the oil filter and oil-additive dispensing device contains oil additive material.

12. The method of claim 11 further comprising:
- e) determining when the oil filter and oil-additive dispensing device is exhausted and unable to dispense additional additives; and
- f) alerting the vehicle operator of the need to replace the oil filter and oil-additive dispensing device with a second, unused, oil filter and oil-additive dispensing device; then, at some later time,
- g) communicating to the on-vehicle computer that the second unused oil filter and engine oil additive dispensing device has been installed;

h) resetting parameters in the on-vehicle computer to values representative of an unused oil filter and engine oil additive dispensing device;

i) dispensing lubricating oil additives from the second unused oil filter and engine oil additive dispensing device to restore lubricating capability to the lubricating oil.

13. The method of claim 12 further comprising the step of confirming dispensing of the additive through electrical measurements of the oil.

14. The method of claim 12 wherein the oil filter and oil-additive dispensing device comprises a sensor for confirming dispensing of additive in communication with the computer and further comprising the step of verifying dispensing of additive.

15. The method of claim 11 wherein the sensor is a device for making electrical measurements of the lubricant and the lubricating quality of the lubricant is assessed using electrical measurements of the oil.

16. The method of claim 11 wherein the sensor is a device for making temperature measurements of the lubricant and the lubricating quality of the lubricant is assessed using algorithms employing measures of lubricant temperature.

17. The method of claim 11 wherein the sensor is a device for measuring engine operating time and the lubricating quality of the lubricant is assessed based on engine operating time.

18. The method of claim 11 wherein the sensor is an odometer and the lubricating quality of the lubricant is assessed based on vehicle distance traveled.

19. The method of claim 11 wherein the oil filter and oil-additive dispensing device comprises a sensor for confirming dispensing of additive in communication with the computer and further comprising the step of verifying dispensing of additive.

* * * * *